US008635294B2

(12) United States Patent
Cavalcante et al.

(10) Patent No.: US 8,635,294 B2
(45) Date of Patent: Jan. 21, 2014

(54) SYSTEM, METHOD AND PROGRAM PRODUCT FOR PROACTIVELY PROVISIONING EMERGENCY COMPUTER RESOURCES USING GEOSPATIAL RELATIONSHIPS

(75) Inventors: Victor Fernandes Cavalcante, Campinas (BR); Ricardo Guimaraes Herrmann, Sao Paulo (BR); Kiran Mantripragada, Santo Andre (BR); Marco Aurelio Stelmar Netto, Sao Paulo (BR); Lucas Correia Villa Real, Sao Paulo (BR); Cleidson Ronald Botelho De Souza, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 13/275,313

(22) Filed: Oct. 18, 2011

(65) Prior Publication Data

US 2013/0097249 A1 Apr. 18, 2013

(51) Int. Cl.
*G06F 15/16* (2006.01)
(52) U.S. Cl.
USPC ........... 709/206; 709/226; 709/224; 709/217; 709/227; 725/106; 725/110; 379/37; 379/45; 379/38; 379/42
(58) Field of Classification Search
USPC ......................................... 709/206, 226, 217
See application file for complete search history.

(56) References Cited

U.S. PATENT DOCUMENTS

| 7,725,565 B2 | 5/2010 | Li et al. | |
| 2005/0190892 A1* | 9/2005 | Dawson et al. | 379/37 |
| 2005/0197775 A1* | 9/2005 | Smith | 702/3 |
| 2007/0296574 A1* | 12/2007 | Smith et al. | 340/539.13 |
| 2010/0159871 A1 | 6/2010 | Tester | |
| 2010/0175006 A1 | 7/2010 | Li | |
| 2011/0037571 A1* | 2/2011 | Johnson et al. | 340/10.5 |
| 2011/0053553 A1* | 3/2011 | Lambert et al. | 455/404.2 |
| 2011/0093908 A1* | 4/2011 | Van Vleck et al. | 725/106 |
| 2012/0092161 A1* | 4/2012 | West | 340/540 |

FOREIGN PATENT DOCUMENTS

WO WO2010075233 1/2010

OTHER PUBLICATIONS

Beckman et al., "SPRUCE: A System for Supporting Urgent High-Performance Computing", "Grid-Based Problem Solving Environments", 2007.
Beckman et al., "Building an infrastructure for urgent computing", "High Performance Computing and Grids in Action", 2007.
Chaisiri et al., "Optimization of Resource Provisioning Cost in Cloud Computing", "Transactions on Services Computing", 2011, vol. 99, Number PrePrints, Publisher: IEEE.

(Continued)

*Primary Examiner* — Jude Jean Gilles
(74) *Attorney, Agent, or Firm* — Law Office of Charles W. Peterson, Jr.; Louis J. Percello, Esq.

(57) ABSTRACT

An emergency response system, method of responding to emergencies and a computer program product therefor. Networked provider computers are distributed over a geographical area that includes multiple regions with at least one providing computing capability to each region and each region receiving emergency response resources during emergencies from an emergency response computer. During any local emergency the area emergency response computer provides a local response and notifies other emergency response computers for other regions that are potentially affected by the emergency.

25 Claims, 7 Drawing Sheets

(56) References Cited

OTHER PUBLICATIONS

Sjaugi, et al., "Review on Concurrent Data Transfer in Grid Computing", "Managed Grids and Cloud Systems in the Asia-Pacific Research Community", 2010, p. 195 Publisher: Springer.

Yang et al., "Spatial Cloud Computing: How geospatial sciences could use and help to shape cloud computing", "International Journal on Digital Earth", 2011.

Zhu et al., "Twinkle: A Fast Resource Provisioning Mechanism for Internet Services", "Infocom", 2011, Publisher: IEEE.

Yates, D., and Paquette, S., "Emergency knowledge management and social media technologies: A case study of the 2010 Haitian earthquake", "International Journal of Information Management", Feb. 3, 2011, pp. 6-13, vol. 31, No. 1, Publisher: Elsevier Ltd.

* cited by examiner

SYSTEM, METHOD AND PROGRAM PRODUCT FOR PROACTIVELY PROVISIONING EMERGENCY COMPUTER RESOURCES USING GEOSPATIAL RELATIONSHIPS

BACKGROUND OF THE INVENTION

1. Field of the Invention

The present invention is related to rapidly provisioning resources geospatially for responding to emergencies and more particularly to managing and geospatially provisioning cloud computing resources for responding rapidly to emergencies that may spread beyond its initial location.

2. Background Description

Flooding, bush fires, twisters, earth quakes and other emergency situations require quick reactions based on little or no or even conflicting information. Typical state of the art emergency response systems notify people about local emergency situations, e.g., broadcasting messages to mobile devices in the local geographical region. In addition to notifying mobile device owners, however, responding to any emergency may also require immediate and unconstrained access to computing resources and services to handle the unexpected. Unfortunately, even when such information is available, accessing it still may be limited and/or resources may be constrained. This can and does limit responders' ability to respond to the emergency.

During a regional emergency, when an emergency spreads beyond its initial locale, for example, dealing with the emergency may require a comprehensive response. An effective comprehensive response requires an optimized solution with improved logistics and that leverages computer simulations for response planning and to avoid exacerbating and/or spreading the effects of the emergency. Response planning may rely on simulating transport, emergency impact, food supply, and so forth in real time, to understand different emergency scenarios. The simulations may serve to anticipate issues that might arise in face of an emergency, to help prevent further losses, and to begin reconstruction immediately after the emergency subsides. Web-site response times that are necessary for emergency services typically place demands on computer resources and network bandwidth. Consequently, primary emergency response goals are insuring adequate computer resource availability, insuring responsiveness for providing affected users, companies, and government agencies with services, and enabling them to prepare and respond to the emergencies.

There have been two main approaches to provisioning computer resources and services for and in emergencies, i.e., reservation and on-demand provisioning. Reserving resources required maintaining sufficient resources to cover all reservations to make resources available when and as needed. Unfortunately, this required maintaining excess resources, resources in addition to whatever is currently in use to cover all emergency scenarios at once just to guarantee full coverage. Consumers pay in advance to reserve resources to meet expectations, even though the reserved resources may sit fallow, unused in whole or part for long periods of time. Thus, reserving resources has not proven cost-effective In making resources available on-demand, resource allocation is performed when the resources are needed, e.g., when the emergency situation spreads to the particular locale. However, accessing a distributed and shared computing environment, such as a data center or a cloud infra-structure, requires a setup time. Setup typically requires reorganizing current workloads, configuring resources for new workload, and transferring necessary emergency data for processing. The setup time may add a significant delay at a critical time and allow the emergency to result in more damage than might otherwise be unnecessary.

Thus, there is a need for quickly making computing resources available to emergency responders and more particularly in efficiently and reliably making adequate computing resources quickly available to responders during emergencies.

SUMMARY OF THE INVENTION

A feature of the invention is advance notice to prepare for the potential effects of an ongoing emergency;

Another feature of the invention is advance provisioning of on demand services in regions that may be affected by ongoing emergency before the emergency affects the region;

The present invention relates to an emergency response system, method of responding to emergencies and a computer program product therefor. Institutions that manage regions use networked provider computers, e.g., rented computers. Regions can include, for example, states, cities, or suburbs, and the respective computers can be located anywhere, in or out of the respective regions. During any emergency in a local region, one respective computer handles resources for the emergency and notifies emergency response computers for other regions that may be affected by the emergency. This provides advance notice to provision resources for those other regions.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
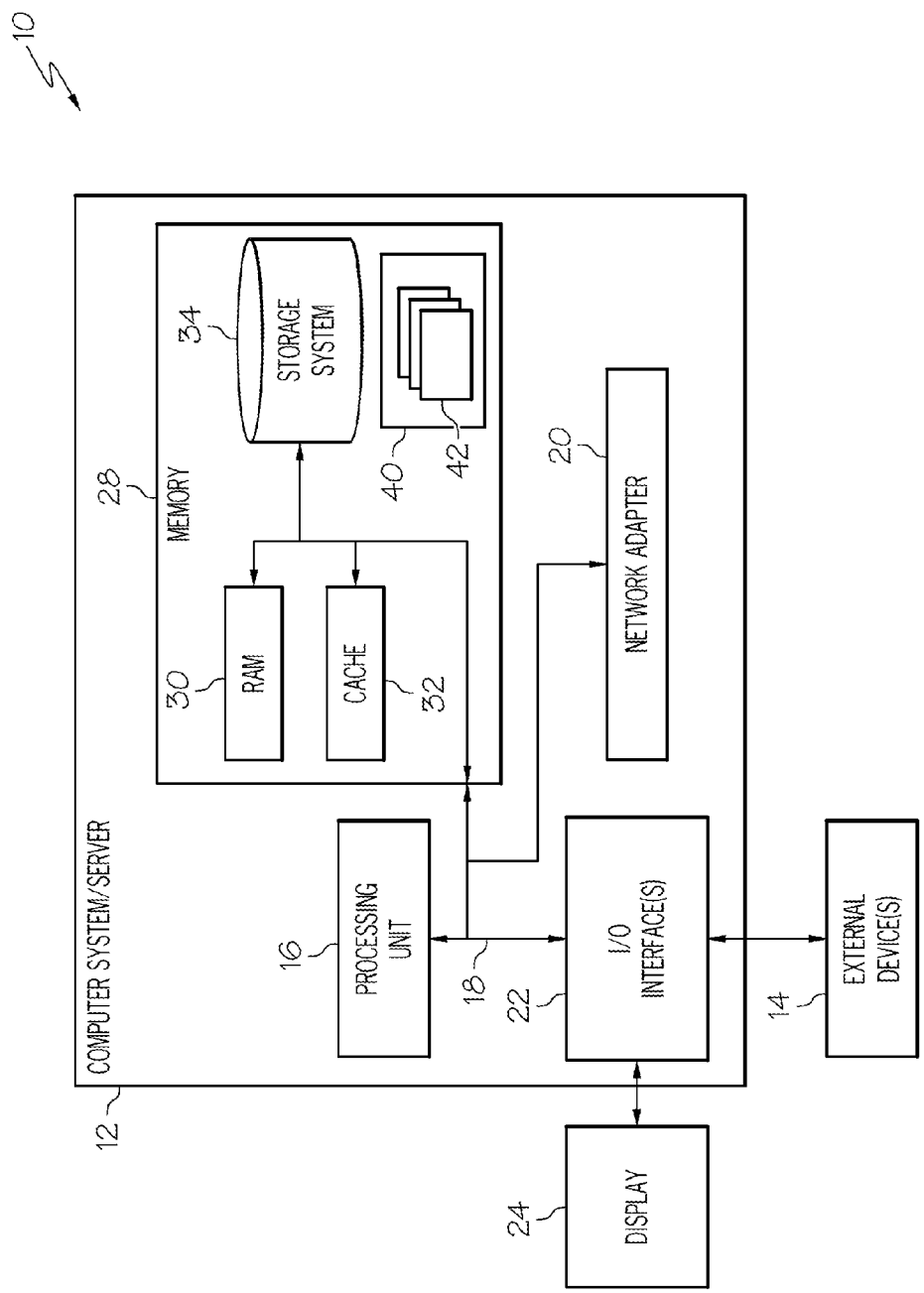
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed and as further indicated hereinbelow.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Previously, however, this rapid elasticity frequently did not provision capabilities fast enough for responding to spreading effects of regional emergencies.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
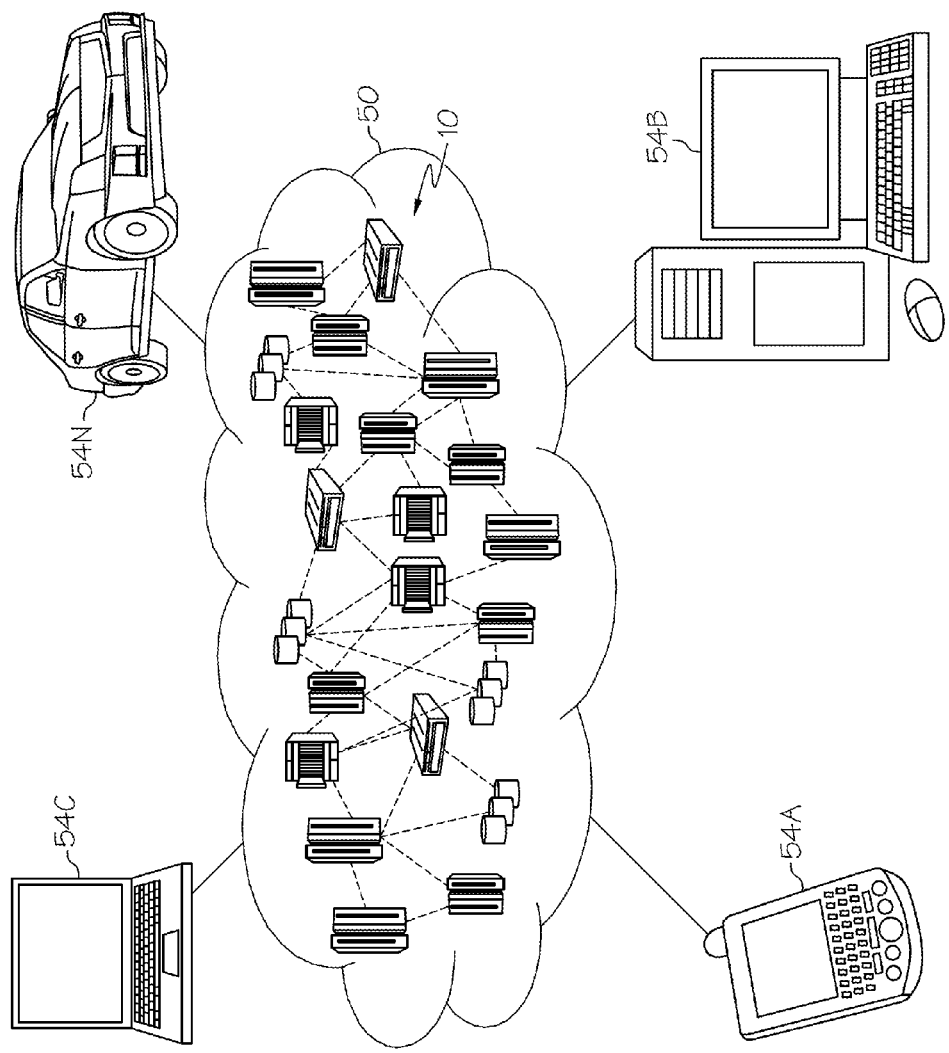
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
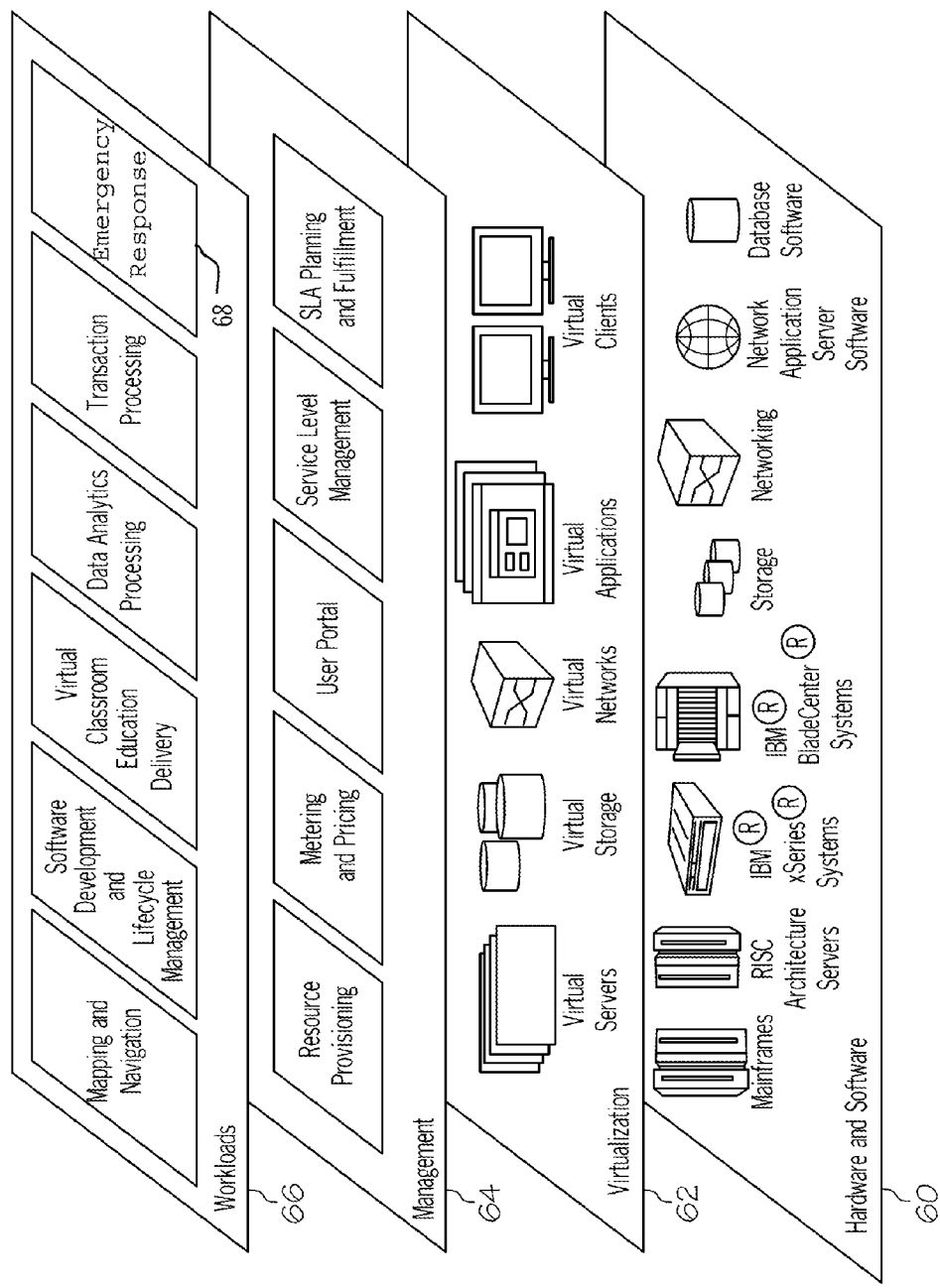
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and emergency response services 68.

Figure 4A:
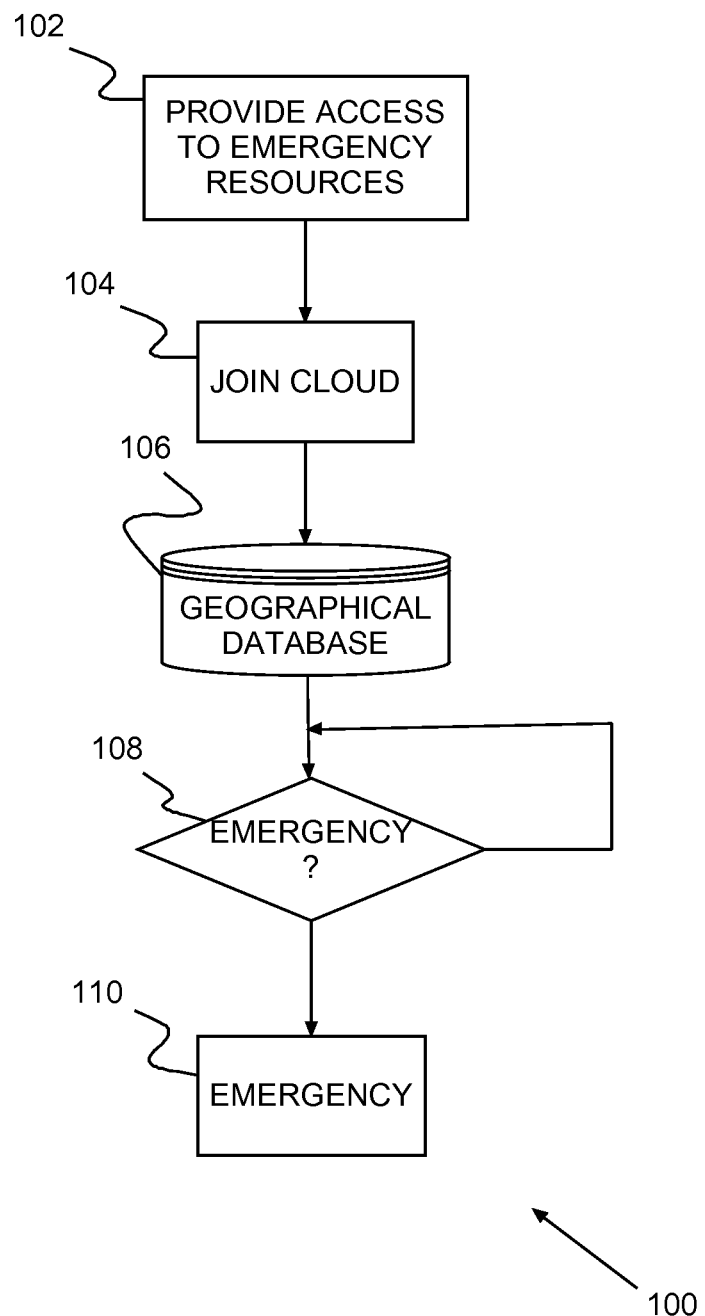
FIGS. 4A-B show an example of geocentrically organizing resources in a distributed computing environment for geospatially provisioning resources, according to a preferred embodiment of the present invention.
Figure 4B:
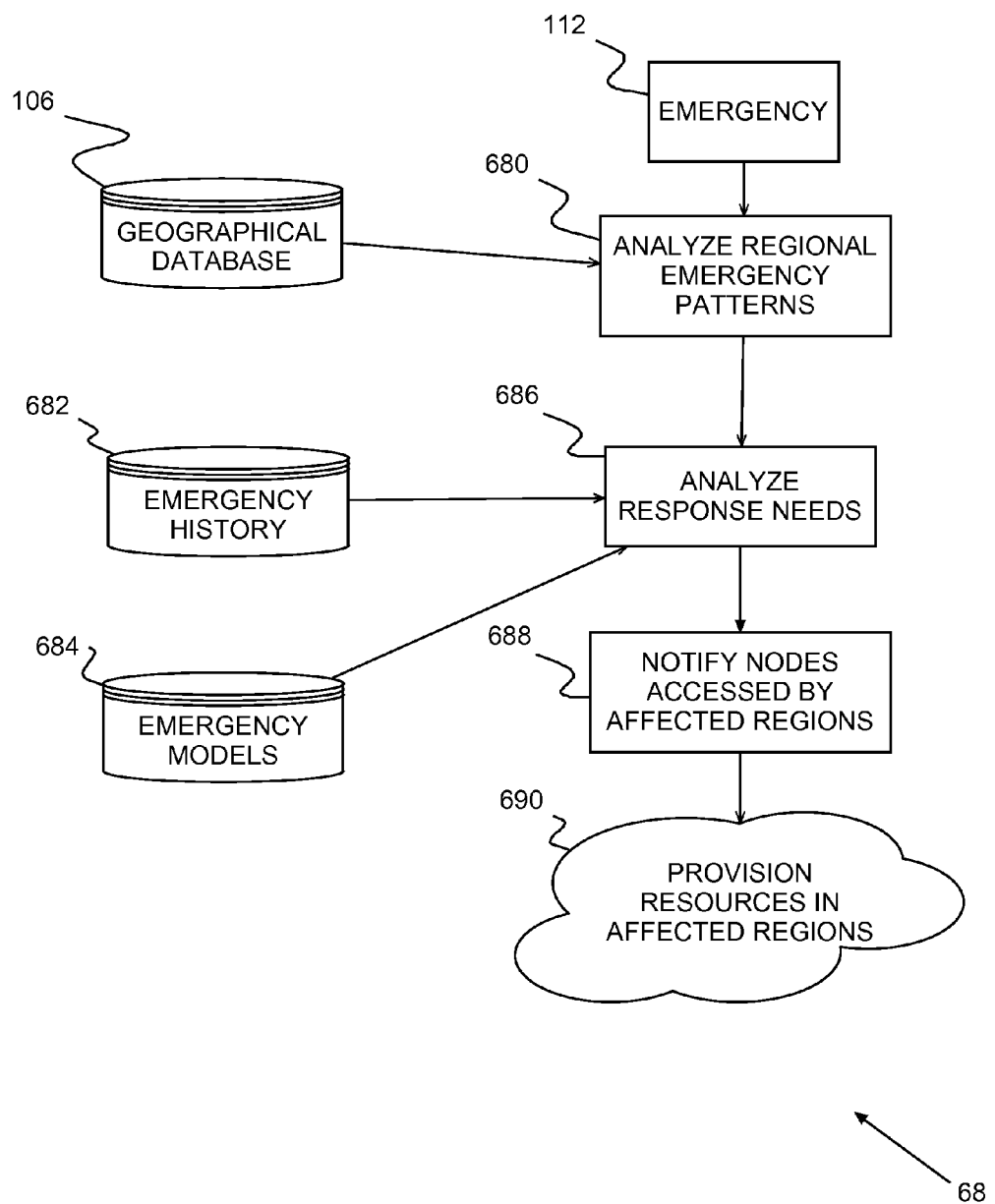

FIGS. 4A and 4B show an example of geocentrically organizing resources 100 in a distributed computing environment, e.g., cloud environment 50 of FIG. 2, for geospatially provisioning emergency response resources 68, according to a preferred embodiment of the present invention. In this example, the computing infrastructure includes multiple computing nodes 10 that may be distributed for use geographically, e.g., by a number of regions, states or cites. Infrastructure may be distributed geographically in cloud computing based on geospatial considerations as described in, for example, Yang, et al., "Spatial cloud computing: how can the geospatial sciences use and help shape cloud computing?" *International Journal on Digital Earth* (Jun. 21, 2011).

It should be noted that the specific location of each node 10 is not critical. All nodes may be collocated in a single location; uniformly distributed amongst the various regions, states or cites; or, otherwise distributed, provided each node 10 adequately serves the particular region, state or city renting or otherwise relying on services from the node 10.

So in this example, a geographical area with a number of smaller local regions has an emergency response node 10 for each particular region that hosts and, provides access to 102, computing resources for that region. There is at least one emergency response node 10 for each region providing emergency response resources for that region. All emergency response nodes 10 join 104, or are added to, the same cloud 50.

Each emergency response node 10 receives geographical data and maintains a geographical relationship database 106 that describes relationships among the geographical regions. The database contains information about, for example, rivers, and cities and towns in each local region, and describes the inter-relationships of each, e.g., the cities crossed by, or along the banks of, a given river. The nodes 10 for each region operate normally, with each emergency response node 10 waiting 108 for the occurrence of an emergency 110 in its respective regions. For an example of how emergency response nodes 10 may detect an emergency, see, e.g., published U.S. Patent application No. 2010/0175006 A1 to Li, the contents of which are incorporated herein by reference.

In particular, organizing 100 and provisioning emergency response resources 68 according to the present invention advances emergency response setup of computational resources; and, reduces the response setup time for geographical regions that may be subsequently affected by the emergency. The computational resources, for example, may be in a computing infrastructure that manages resource pools rented by governmental institutions responsible for regions, e.g., states, cities, or suburbs. Emergency response setup is advanced, essentially, by proactively provisioning computer resources for prospectively affected regions based on existing geospatial relationships between the regions.

So when an emergency occurs 110, the emergency response node 10 for the emergency zone (i.e., the local region where the emergency is initially detected/originating) analyzes 680 data from the geographical relationship database 106 and determines how the emergency may spread beyond that region. In particular, the originating zone node 10 determines 680 how the emergency might trigger events in other related regions, e.g., affecting regions upstream and/or downstream on a flooding river running through the current emergency zone. Then, the originating zone node 10 retrieves historical data 682 collected from prior emergencies and one or more emergency resources provisioning models 684. Provisioned resources for an emergency include computational capacity, provisioned services and data needs. The originating zone node 10 analyzes 686 the historical data 682 and emergency models 684 to determine what resources and services are expected to be required for the current emergency, including resources in other affected regions.

Then, the originating zone node 10 initiates pre-emergency response for the other affected regions, notifying 688 emergency response nodes 10 for each of expected resource requirements and what services to trigger. Thus, the respective emergency response nodes 10 are given advance notice for an opportunity to prepare 690 for expected triggering events in the respective affected regions. In particular, the affected region nodes 10 can begin provisioning computing resources 690 and loading data and services for the projected affected regions. For example, the affected region nodes 10 provisions virtual machines and network components necessary for executing emergency services, e.g., computer simulations to optimize handling transportation, supplies and, accommodating for emergency response.

Figure 5A:
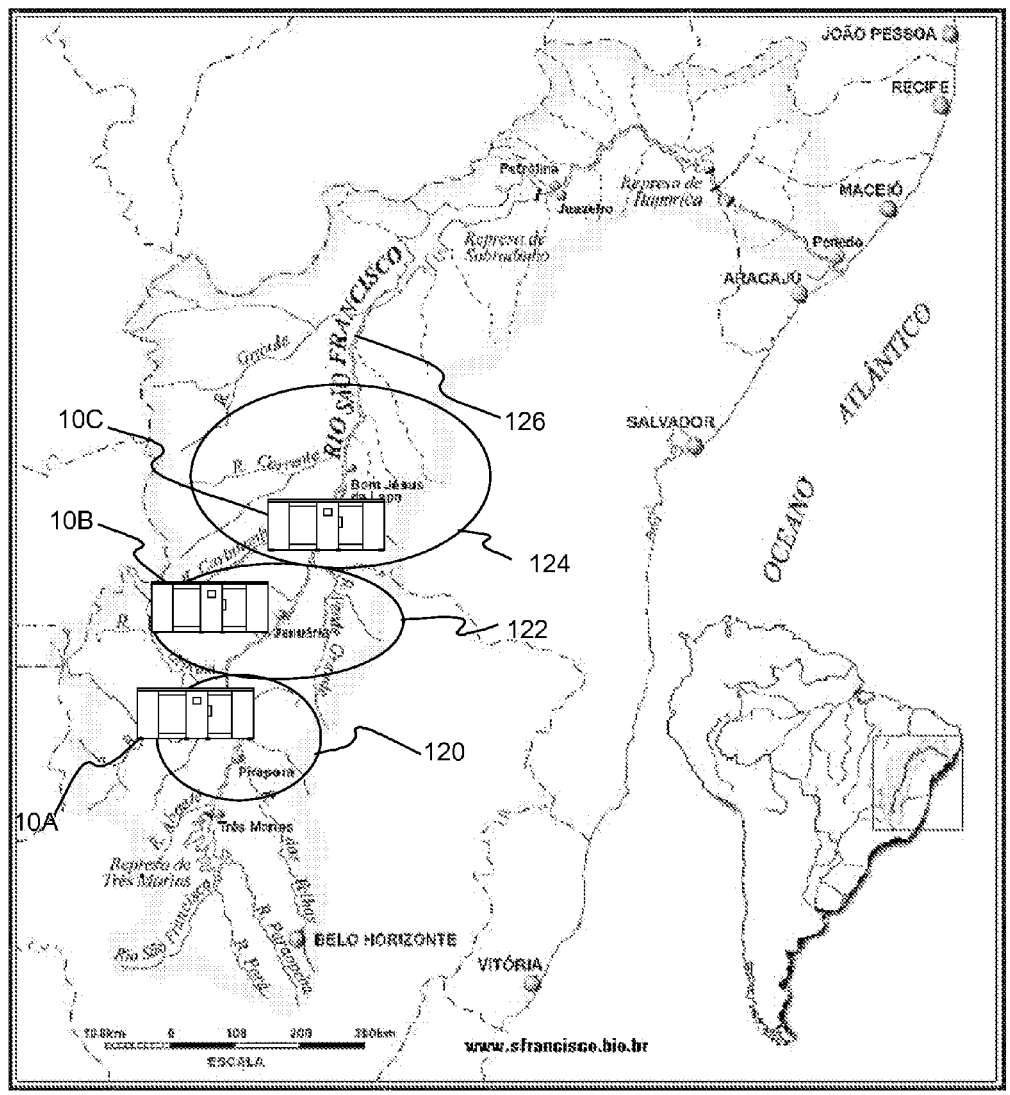
FIGS. 5A and B show an example of an emergency situation (flooding) taking place in three (3) contiguous regions along the Sao Francisco River.
Figure 5B:
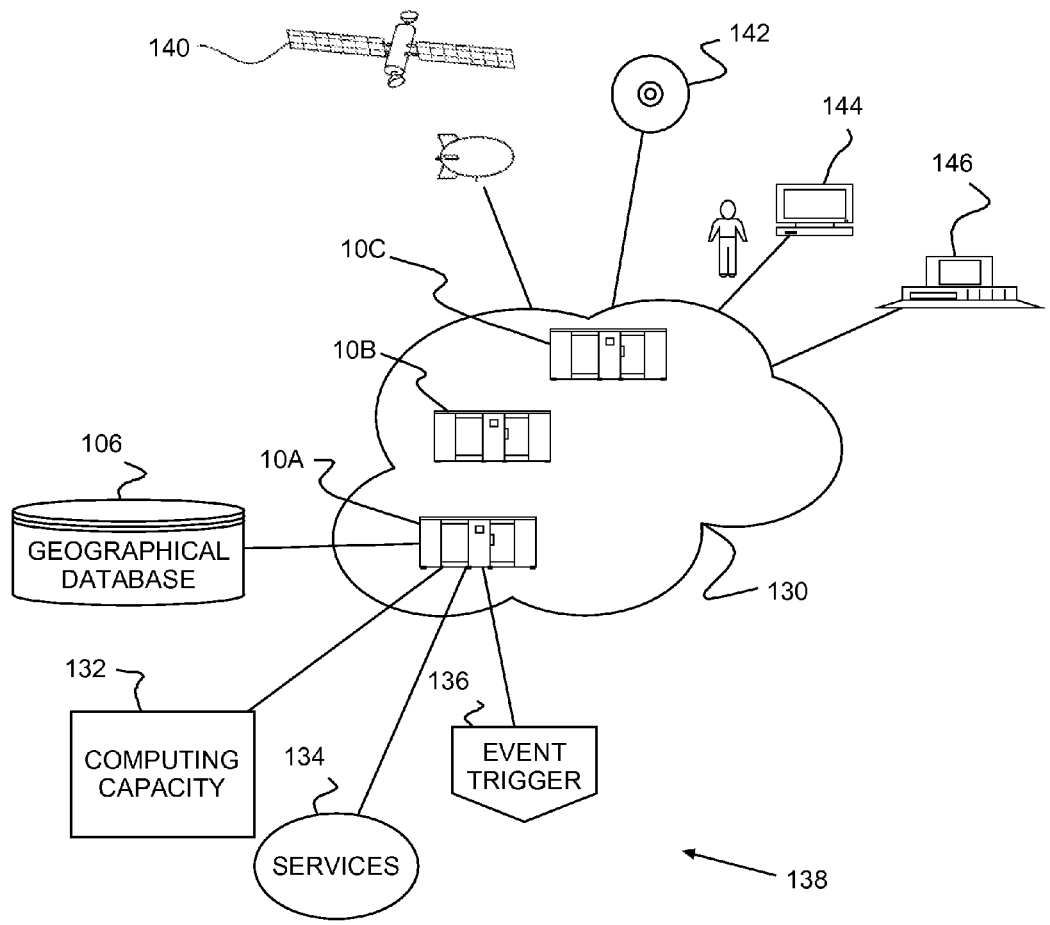

FIGS. 5A and B show an example of an emergency situation (flooding) taking place in three (3) contiguous regions, cities 120, 122, and 124, along the Sao Francisco River 126. The Sao Francisco River 126 flows south to north. The cities 120, 122, 124 are related in that, city 120 is immediately upstream of city 122, which is immediately upstream of city 124 and flooding tends to flow downstream. An emergency response node 10A 10B, 10C in computing infrastructure 130 for the entire region supports each of the cities 120, 122, 124. Each emergency response node includes a region database 106, some level of computing capacity 132, a service capability 134 and an emergency and event trigger monitor 136. In this example, all 3 cities 120, 122, 124 obtain resources 138 from the computing infrastructure 130. Resources 138 provided to the nodes 10A, 10B, 10C include monitoring sensors 140, e.g., video sensors and radar, located at least in or around all 3 cities 120, 122, 124; defined region relationships 142 include availability of supplies, transportation and accommodations; and data is received from manual inputs 144. A data mining capability 146 analyzes the regional relationships with respect to sensor and manually input data.

So, for example, heavy southern rains cause flooding upstream and moving downstream on the Sao Francisco River 126. The flooding first reaches city 120 at the source of the Sao Francisco River 126. The emergency response node 10A may use sensors, forecasting models, etc. to detect (110 in FIGS. 4A and B) the emergency. Once the emergency response node 10A for the most upstream city 120 detects the flooding 110, the emergency response node 10A automatically analyzes 680 how the emergency may affect downstream areas based on the geographical relationship among the cities 120, 122, 124 with regard to the river 126. Based on the results of that analysis, the emergency response node 10A automatically analyzes resource needs 686 for the downstream areas 122 and 124 that are expected to be affected. Then, the emergency response node 10A notifies 688 those areas 122 and 124 of the impending emergency, which triggers resource provisioning 690 by emergency response nodes 10B and 10C for those areas 122 and 124.

Thus advantageously, in an emergency the present invention provides a capability for advancing starting for a given infrastructure (e.g., cloud computing, datacenter) for dealing with the emergency. Whenever an emergency situation arises in a region, an emergency response node for the region initiates prospectively provisioning computer resources of other regions that may be affected by the emergency. This minimizes/avoids delaying placing important services to work when the need subsequently arises for those services for dealing with the current on-going emergency. This also allows those targeted locations to pre-provision and setup computational resources to handle the expected effects of the emergency. Thus, the present invention reduces the total service deployment makespan for the overall geographical area.

Emergency response resources are deployed for use by services that cannot wait for those resources to become available. Moreover, this availability provides service owners that could not otherwise afford buying and maintaining an infrastructure to adequately respond, but that would remain idle until an emergency actually arises.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. An emergency response system comprising:
   a plurality of provider computers providing computing capability to a geographical area, said geographical area including a plurality of regions, one or more provider computer providing computing capability for each region, at least one provider computer for each region being an emergency response computer providing emergency response resources during emergencies;
   a plurality of client computers in said geographical area, said plurality of provider computers providing computational resources to said plurality of client computers; and
   a network, said plurality of client computers and said plurality of client provider computers belonging to, and communicating with each other over, said network, during any local emergency the respective emergency response computer selectively making emergency response resource capacity available to clients in the local region and notifying other emergency response computers for regions potentially affected by the local emergency.

2. An emergency response system as in claim 1, said each emergency response computer including a geographical database indicating the relationship of said plurality of regions in said geographical area.

3. An emergency response system as in claim 2, upon identifying the occurrence of an emergency in a region the emergency response computer for that region identifying said regions potentially affected by the local emergency and predicts potential effects in said regions.

4. An emergency response system as in claim 1, said each emergency response computer including a history database with history of prior emergencies and an emergency response model database with models of capacity, services and data handling needs in emergencies.

5. An emergency response system as in claim 4, after identifying the occurrence of an emergency in a region, the respective emergency response computer determining the computational resources required to respond to the emergency, notifying said other emergency response computers of required resources for responding to effects of the emergency in the respective other regions and triggering services for responding to the emergency in said other emergency response computers in said respective regions.

6. An emergency response system as in claim 5, said other emergency response computers provisioning said required resources responsive to being notified prior to said local emergency affecting said respective regions.

7. An emergency response system as in claim 1, said plurality of provider computers operating the same cloud environment, said plurality of client computers accessing, and being provided access to, cloud resources provisioned by said plurality of provider computers and to emergency response resources provisioned by a respective said emergency response computer.

8. An emergency response system as in claim 1, herein at least one said emergency response computer is located outside of the region receiving computing capability.

9. A method of responding to an emergency, said method comprising:
   waiting for the local occurrence of an emergency in one of a plurality of regions in a geographical area, each region receiving computing capability from an emergency response computer monitoring for emergencies and networked with emergency response computers providing computing capability every other region; and in response to an emergency in any region, a respective emergency response computer
      analyzing regional emergency patterns to predict said emergency's pattern, the predicted pattern identifying other regions that may be affected by said emergency,
      analyzing emergency response needs to predict computational resources required for responding to said emergency,
      notifying said emergency response computers for said other regions that the respective region may be affected by said emergency, and
      triggering emergency response services for said other regions.

10. A method of responding to an emergency as in claim 9, before waiting for the local occurrence of an emergency, said method further comprising:
    providing said emergency response computer with access to emergency resources;
    said emergency response computer joining a cloud for said geographical area; and
    providing a geographical database to said emergency response computer, said geographical database relating regions in said geographical area.

11. A method of responding to an emergency as in claim 10, wherein analyzing said regional emergency patterns comprises analyzing regional relationships from said geographical database to predict said emergency's pattern.

12. A method of responding to an emergency as in claim 10, wherein said emergency response computers for related said areas are in the same said cloud, a plurality of client computers accessing, and being provided access to, cloud resources provisioned by a plurality of provider computers including said emergency response computers, and wherein emergency response resources are provisioned for each region by a respective said emergency response computer.

13. A method of responding to an emergency as in claim 9, wherein analyzing said emergency response needs comprises applying emergency resource response models to emergency history from an emergency history database.

14. A method of responding to an emergency as in claim 9, wherein after triggering said emergency response services, said method comprises each notified said emergency response computer provisioning resources for responding to effects of said emergency in a respective region.

15. A computer program product for managing emergency response resources, said computer program product comprising a non-transitory computer usable medium having computer readable program code stored thereon, said computer readable program code causing a computer executing said code to:
    wait for a local emergency to occur in a region in a geographical area, said geographical area including a plurality of regions;

analyze regional emergency patterns to predict the pattern for said local emergency, the predicted pattern identifying other regions that may be affected by said local emergency;

analyze emergency response needs for responding to said local emergency;

predict computational resources required for responding to said local emergency;

notify said emergency response computers for said other regions; and trigger emergency response services for said other regions.

16. A computer program product for managing emergency response resources as in claim 15, wherein before waiting, said computer readable program code causes said computer to:

access emergency resources;

join a cloud for said geographical area, an emergency response computer in said cloud waiting for local emergencies in each region; and receive a geographical database relating regions in said geographical area.

17. A computer program product for managing emergency response resources as in claim 16, wherein said computer readable program code causes said computer to analyze regional relationships from said geographical database to predict the pattern of said local emergency.

18. A computer program product for managing emergency response resources as in claim 15, wherein said computer readable program code causes said computer to provision emergency response resources for said region responsive to notification by an emergency response computer for another of said plurality of regions.

19. A computer program product for managing emergency response resources as in claim 15, wherein said computer readable program code causes said computer to apply emergency resource response models to emergency history from an emergency history database.

20. A computer program product for managing responses to emergencies, said computer program product comprising a non-transitory computer usable medium having computer readable program code stored thereon, said computer readable program code comprising:

computer readable program code means for monitoring a region for the occurrence of an emergency, said region being one of a plurality of regions in a geographical area;

computer readable program code means for predicting others of said plurality of regions that may be affected by said emergency;

computer readable program code means for notifying emergency response computers for said others that effects of said emergency is predicted to spread to said others; and computer readable program code means for provisioning computational resources required to respond to said emergency responsive to being notified.

21. A computer program product for managing responses to emergencies as in claim 20, further comprising computer readable program code means for storing a geographical database indicating the relationship of said plurality of regions in said geographical area.

22. A computer program product for managing responses to emergencies as in claim 20, further comprising computer readable program code means for storing a history database with history of prior emergencies and an emergency response model database with models of capacity, services and data handling needs in emergencies.

23. A computer program product for managing responses to emergencies as in claim 22, further comprising:

computer readable program code means for determining the computational resources required to respond to the emergency;

computer readable program code means for notifying said other emergency response computers of required resources for responding to effects of the emergency for the respective regions; and computer readable program code means for triggering services for responding to the emergency in said other emergency response computers for said respective regions.

24. A computer program product for managing responses to emergencies as in claim 23, wherein said computer readable program code means for provisioning said required resources causes said computational resources to be provisioned prior to said emergency affecting said respective regions.

25. A computer program product for managing responses to emergencies as in claim 20, further comprising:

computer readable program code means for joining a cloud with said other emergency response computers; and computer readable program code means for provisioning and providing access to cloud resources to a plurality of client computers in said region.

* * * * *